US012756759B2

(12) United States Patent
Alvarez Dominguez et al.

(10) Patent No.: US 12,756,759 B2
(45) Date of Patent: Oct. 6, 2026

(54) TECHNIQUE FOR HANDLING SUBSCRIPTION-RELATED CAPABILITY INFORMATION STORED IN A CORE NETWORK DOMAIN

(71) Applicant: Telefonaktiebolaget LM Ericsson (publ), Stockholm (SE)

(72) Inventors: Rodrigo Alvarez Dominguez, Madrid (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 31 days.

(21) Appl. No.: 18/575,458

(22) PCT Filed: Jul. 27, 2021

(86) PCT No.: PCT/EP2021/070985
§ 371 (c)(1),
(2) Date: Dec. 29, 2023

(87) PCT Pub. No.: WO2023/274564
PCT Pub. Date: Jan. 5, 2023

(65) Prior Publication Data

US 2024/0333805 A1 Oct. 3, 2024

(30) Foreign Application Priority Data

Jul. 2, 2021 (EP) .................................... 21382595

(51) Int. Cl.
*H04L 67/141* (2022.01)
*H04L 67/306* (2022.01)

(52) U.S. Cl.
CPC .......... *H04L 67/141* (2013.01); *H04L 67/306* (2013.01)

(58) Field of Classification Search
None
See application file for complete search history.

(56) References Cited

U.S. PATENT DOCUMENTS 8,259,623 B2 * 9/2012 Momtahan .............. H04L 47/15 709/227
2008/0037522 A1 * 2/2008 Rasanen ............... H04L 65/103 370/352
2010/0106500 A1 * 4/2010 McKee ................... G10L 15/26 704/235
(Continued)

FOREIGN PATENT DOCUMENTS

EP 3095273 B1 * 8/2018 ............ H04W 48/18
WO WO-2014066885 A1 * 5/2014 ....... H04N 21/64322
(Continued)

OTHER PUBLICATIONS

3GPP TS 29.522 V17.0.0 (Dec. 2020) (Year: 2020).*
(Continued)

*Primary Examiner* — Tonia L Dollinger
*Assistant Examiner* — Ishrat Rashid
(74) *Attorney, Agent, or Firm* — COATS & BENNETT, PLLC

(57) ABSTRACT

A technique of handling capability information stored in a subscriber database in a core network domain of a wireless communication network is presented. A method implementation of the technique comprises receiving a subscriber capability request, wherein the subscriber capability request includes an identifier associated with a subscription. The method further comprises retrieving from the subscriber database, in response to the subscriber capability request, subscriber capability information for the subscription associated with the first identifier. The subscriber capability information is indicative of support of at least one non-A/V medium different from video (V) and audio (A) in a subscriber domain, such as a olfactory (scent-related) or tactile
(Continued)

300

(haptic) medium. Further still, the method comprises sending a subscriber capability response including the subscriber capability information.

19 Claims, 11 Drawing Sheets

(56) References Cited

U.S. PATENT DOCUMENTS

2019/0261260 A1 8/2019 Dao et al.
2022/0012606 A1* 1/2022 Jordan .................. B60K 35/22

FOREIGN PATENT DOCUMENTS

WO 2020014214 A1 1/2020
WO WO-2020112480 A1 * 6/2020 .............. H04W 4/50
WO 2021083930 A1 5/2021

OTHER PUBLICATIONS

3rd Generation Partnership Project, "3rd Generation Partnership Project; Technical Specification Group Core Network and Terminals; 5G System; Network Exposure Function Northbound APIs; Stage 3 (Release 17)", Technical Specification, 3GPP TS 29.522 V17.0.0, Dec. 2020, pp. 1-168, 3GPP.

3rd Generation Partnership Project, "3rd Generation Partnership Project; Technical Specification Group Services and System Aspects; System Architecture for the 5G System; Stage 2 (Release 15)"; Technical Specification, 3GPP TS 23.501 V15.4.0, Dec. 2018, pp. 1-236, 3GPP.

3rd Generation Partnership Project, "3rd Generation Partnership Project; Technical Specification Group Services and System Aspects; Procedures for the 5G System (5GS); Stage 2 (Release 17)", Technical Specification, 3GPP TS 23.502 V17.1.0, Jun. 2021, pp. 1-692, 3GPP.

* cited by examiner

300

TECHNIQUE FOR HANDLING SUBSCRIPTION-RELATED CAPABILITY INFORMATION STORED IN A CORE NETWORK DOMAIN

TECHNICAL FIELD

The present disclosure generally relates to wireless communication. In more detail, aspects in the context of handling subscription-related capability information stored in a core network domain of a wireless communication network are presented. These aspects can be implemented as methods, computer program products, apparatuses and a system.

BACKGROUND

The consumption of digital content including audio (A) and video (V) media has become increasingly popular in the last decades. With the introduction of high speed wireless communication technologies of the $4^{th}$ Generation (4G) and the $5^{th}$ Generation (5G), such content is today also heavily consumed via mobile consumer devices such as smartphones.

It is expected that the next decade will increasingly see the introduction of non-A/V media to enhance user experience, which is sometimes also referred to as the "Internet of Senses". As an example, scent technology (also called olfactory technology) enables controlling output of an olfactory medium in a consumer domain and can form the basis of scent-enabled digital content such as web pages, video games, movies and music. As a further example, tactile technology targets at output of a haptic medium in the context of haptically enabled digital content. The resulting haptic user experience can relate to the perception and manipulation of objects using touch and proprioception. Proprioception is the sense of the relative positioning of one body's parts and the strength of effort used in a movement.

To experience non-A/V media, the consumer will need a generator capable of generating tactile, scent-related or other non-A/V sensual output. A scent generator may, for example, be integrated into a television set that supports scent-enabled movies. A generator for tactile feedback can be integrated into a wearable device such as a glove.

With the widespread introduction of non-A/V media, content providers may wish to offer digital content such as non-A/V-enabled movies or music to consumers as streaming services. Other non-A/V-enabled digital content such as web pages may be offered by content providers for download as regular Internet services.

In these and other digital content provision scenarios, content providers face various challenges. For example, content providers may not be aware of whether or not a domain of a particular consumer is technically capable of supporting output of non-A/V media. Some content providers may install a proprietary application on a consumer device and exchange proprietary signalling with that application to determine capability information regarding non-A/V media support in the consumer domain (e.g., to determine if a scent generator is installed). However, not all consumers may wish to install such applications, and not all content providers may have a proprietary application for installation on a consumer device.

Another solution for implementing the Internet of Senses and similar content services could be the use different uniform resource identifiers (URIs) for media access, depending on whether or not a given web browser or other Internet-enabled application in the consumer domain is capable of supporting non-A/V media output (e.g., http://internetofsense/app.html vs. http://app.html). One drawback of such an approach results from the fact that it may be difficult to duplicate or tag the URIs differently depending on the type of access (e.g., mobile vs. non-mobile access, etc.), which may be desirable to enhance user experience, or for other purposes.

SUMMARY

Accordingly, there is a need for a technique that avoids one more of the above or other drawbacks and that enables an efficient handling of non-A/V media support, in particular when the non-A/V media are consumed via a wireless communication network.

According to a first aspect, a method of retrieving capability information from a subscriber database in a core network domain of a wireless communication network is provided. The method comprises receiving a subscriber capability request, wherein the subscriber capability request includes a first identifier associated with a subscription. The method further comprises retrieving from the subscriber database, in response to the subscriber capability request, subscriber capability information for the subscription associated with the first identifier, wherein the subscriber capability information is indicative of support of at least one non-A/V medium different from video (V) and audio (A) in a subscriber domain. Further still, the method comprises sending a subscriber capability response including the subscriber capability information.

The subscriber capability request may include an indicator indicative of the subscriber capability request being directed to non-A/V medium support. The indicator may be used to differentiate the subscriber capability request directed to non-A/V medium support from other types of subscriber capability requests.

The subscriber capability request may be received from, and the subscriber capability response may be sent to, a core network entity interfacing a content provider domain capable of controlling transmission towards the subscriber domain of digital content relating to (e.g., controlling output of) the at least one non-A/V medium. In such a scenario, the subscriber capability request may have been triggered in the content provider domain (e.g., responsive to a subscriber having requested corresponding digital content from the content provider domain). Moreover, the subscriber capability response, or information contained therein, may be sent to the content provider domain.

The network entity interfacing the content provider domain may be a network exposure function (NEF) of a $5^{th}$ Generation-, 5G-, enabled core network domain or a service capability exposure function gateway (SCEF), of a $4^{th}$ Generation-, 4G-, enabled core network domain. In the case of an NEF, the subscriber capability request may be a Nudm_EventExposure Request that has been triggered by an Nnef_EventExposure_Subscribe Request received at NEF from the content provider domain. The subscriber capability response may be a Nudm_EventExposure_Notify message.

The first identifier associated with the subscription may identify a terminal device having requested digital content relating to the at least one non-AV medium. The first identifier may be a subscription permanent identifier (SUPI) or a subscription concealed identifier (SUCI)

The receiving, retrieving and sending steps (and, optionally, one or more further steps as described in the context of the first method aspect) may be performed in the context of a session for transmission of digital content relating to the at least one non-A/V medium towards the subscriber domain. The session may be one or more of a subscriber session, an end-to-end session spanning from the subscriber domain to the content provider domain, and a protocol data unit (PDU) session.

In some variants, the subscriber capability information has a validity limited to a single digital content transmission session. In such variants, a generator capable of generating tactile, scent-related or other non-A/V sensual output may be configured to be selectively enabled or disabled on a per-session basis, so that not every session may be supportive of the at least one non-A/V medium.

The method may further comprise receiving a subscriber capability report including the subscriber capability information. In some variants, the subscriber capability report includes the first identifier (e.g., SUCI) or a second identifier (e.g., SUPI) associated with the subscription. In such a case, the method may also comprise storing the subscriber capability information for the subscription associated with the first or second identifier in the subscriber database.

The subscriber capability information may be received in the core network domain from the subscriber domain in the context of establishment of a digital content transmission session (e.g., a PDU session). The subscriber capability report may be one of a PDU Session Establishment Request message, an Nsmf PDU Session Create message, an Nudr UECM Registration_Request message, and a Nudr_Get Session Management Subscription Data message.

The method may also comprise selecting one or more core network entities for digital content transmission session handling based on the subscriber capability information that is indicative of support of the at least one non-A/V medium. The selecting step may be performed by a session management function (SMF) of a 5G-enabled core network domain or by a control plane packet data network gateway (PGW-C) of a 4G-enabled core network domain. The selecting step may relate to at least one of a user plane function (UPF) and a policy control function (PCF) of a 5G-enabled core network domain or a user plane packet data network gateway (PGW-U) of a 4G-enabled core network domain.

The subscriber capability information may contain at least one non-A/V medium indicator indicative of support of the at least one non-A/V medium. The at least one non-A/V medium indicator may be selected from a tactile (i.e., haptic) medium indicator and an olfactory (i.e., scent-related) medium indicator. Further indicators may be defined as needed for one or more other non-A/V media. Moreover, also a combined indicator for two or more non-A/V media may be defined.

The subscriber database may be hosted by a unified data repository (UDR) entity of a 5G-enabled core network domain or by a home subscriber server (HSS) of a 4G-enabled core network domain. The method of the first aspect may be fully or at least partially be performed in the core network domain.

According to a second aspect, a method of obtaining capability information from a subscriber database in a core network domain of a wireless communication network is provided. The method comprises the steps, performed in a content provider domain, of sending a subscriber capability request, wherein the subscriber capability request includes an identifier associated with a subscription, and of receiving, in response to the subscriber capability request, a subscriber capability response including the subscriber capability information, wherein the subscriber capability information is indicative of support of at least one non-A/V medium different from video (V) and audio (A) in a subscriber domain.

The method of the second aspect may comprise receiving, from the subscriber domain, a content request for digital content relating to the at least one non-A/V medium. The subscriber capability request may then be sent responsive to receipt of the content request.

In the method of the second aspect, the subscriber capability request may be sent to, and the subscriber capability response may be received from, a core network entity interfacing the content provider domain. The core network domain may be configured to notify the content provider domain of core network events based on a subscription scheme. In such a case, the subscriber capability request may be a subscription message defined in the subscription scheme (e.g., in accordance with the 4G or 5G specifications defined by the 3$^{rd}$ Generation Partnership Project, 3GPP).

The network entity interfacing the content provider domain may be a network exposure function (NEF) of a 5G-enabled core network domain or a service capability exposure function gateway (SCEF) of a 4G-enabled core network domain. In the case of an NEF, the subscriber capability request may be an Nnef_EventExposure_Subscribe Request and the subscriber capability response may be a Nnef_EventExposure_Notify message.

In the method of the second aspect, the core network domain may be configured to notify the content provider domain of core network events based on a subscription scheme. The method may in such a variant further comprise sending a subscription message defined in the subscription scheme in advance of the subscriber capability request.

A third aspect relates to a method of providing capability information to a subscriber database in a core network domain of a wireless communication network. The method comprises the step, performed in a subscriber domain, of sending, towards the core network domain, a subscriber capability report including subscriber capability information, wherein the subscriber capability information is indicative of support of at least one non-A/V medium different from video (V) and audio (A) in a subscriber domain.

In the method of the third aspect, the subscriber capability report may sent in the context of establishment of a session for transmission of digital content relating to the at least one non-A/V medium towards the subscriber domain The subscriber capability report may be a PDU Session Establishment Request message.

The method of the third aspect may comprise sending a content request to a content provider domain. The method may further comprise receiving, in response to the content request, digital content relating to the at least one non-A/V medium.

Also provided is a computer program product comprising program code portions for performing the steps of any of the method aspects when the computer program product is executed on one or more processors. The computer program product may be stored on a computer readable recording medium.

Further provided is an apparatus for retrieving capability information from a subscriber database in a core network domain of a wireless communication network. The apparatus is configured to receive a subscriber capability request, wherein the subscriber capability request includes an identifier associated with a subscription. The apparatus is further configured to retrieve from the subscriber database, in response to the subscriber capability request, subscriber capability information for the subscription associated with the identifier, wherein the subscriber capability information is indicative of support of at least one non-A/V medium different from video (V) and audio (A) in a subscriber domain. Further still, the apparatus is configured to send a subscriber capability response including the subscriber capability information. The apparatus may be configured to perform the method of the first aspect.

Moreover, an apparatus is provided for obtaining capability information from a subscriber database in a core network domain of a wireless communication network. The apparatus is configured to send a subscriber capability request, wherein the subscriber capability request includes an identifier associated with a subscription, and to receive, in response to the subscriber capability request, a subscriber capability response including the subscriber capability information, wherein the subscriber capability information is indicative of support of at least one non-A/V medium different from video (V) and audio (A) in a subscriber domain. The apparatus may be configured to perform the method of the second aspect.

Also provided is an apparatus for providing capability information to a subscriber database in a core network domain of a wireless communication network. The apparatus is configured to send, towards the core network domain, a subscriber capability report including subscriber capability information, wherein the subscriber capability information is indicative of support of at least one non-A/V medium different from video, V, and audio, A, in a subscriber domain. The apparatus may be configured to perform the method of the third aspect.

A system is also provided that comprises two or more of the apparatus for retrieving capability information, the apparatus for obtaining capability information, and the apparatus for providing capability information, as generally described herein.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
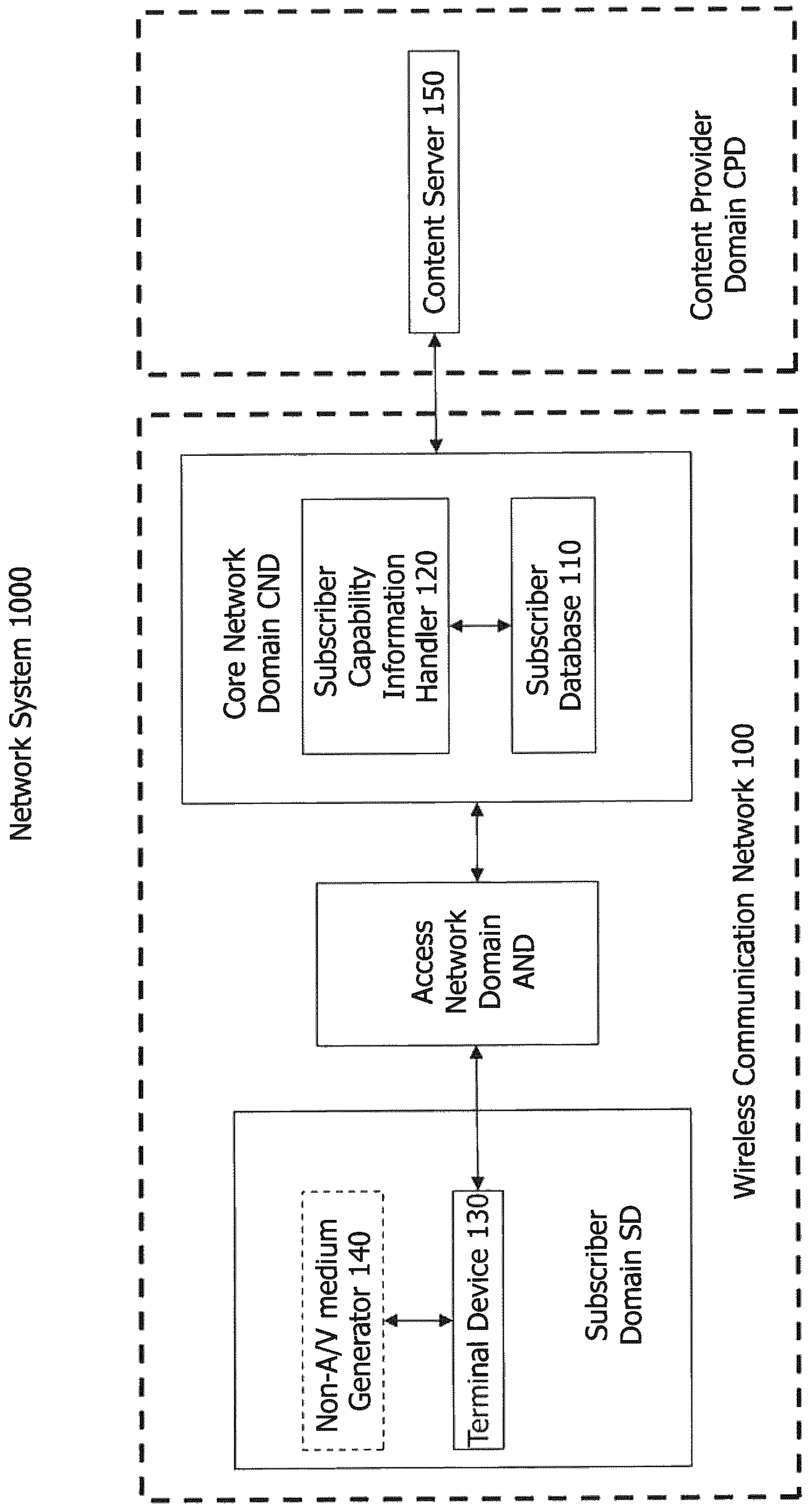
FIG. 1 is a diagram illustrating a network system realization of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with 5G specifications, the present disclosure is not limited in this regard. The present disclosure could, for example, also be implemented in other cellular or non-cellular wireless communication networks having a core network domain, such as those complying with 4G specifications (e.g., in accordance with the Long Term Evolution, LTE, specifications as standardized by the 3$^{rd}$ Generation Partnership Project, 3GPP).

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary realizations of the present disclosure, the same reference numerals denote the same or similar components.

In some of the realizations described hereinafter, a procedure is defined to store, or register, in a core network domain of a wireless communication network consumer domain capabilities that relate to support of at least one non-A/V medium (e.g., Internet of Sense capabilities). The registration takes place in a subscriber database, assuming that the consumer has a subscription to a wireless communication service. For this reason, the consumer is also referred to as subscriber hereinafter.

The core network domain is thus configured to expose to content providers subscriber capability information indicative of support of at least one non-A/V medium in a particular subscriber domain. A particular subscriber domain may be identified by one or more identifiers associated with a particular subscription, including SUPI and SUCI as well as other identifiers.

In some 3GPP-compliant variants of the realizations described hereinafter, the existing 3GPP exposure framework is extended by a new interface, such as a new application programming interface (API), between the core network domain and the content provider domain. In an exemplary 5G-enabled realization, such an interface may be provided between an network exposure function (NEF) of the content provider domain and an application function (AF) of the content provider domain. Such an interface could also be provided in a 4G-enabled realization, for example between a service capability exposure function gateway (SCEF) of the content provider domain and an application server (AS) of the content provider domain. Evidently, the present disclosure is not limited to 3GPP-compliant wireless communication networks.

FIG. 1 illustrates an embodiment of a network system 1000 in which the present disclosure can be realized.

As shown in FIG. 1, the network system 1000 comprises a wireless communication network 100 operated by a network operator. The communication network 100 may be a mobile communication network, in which case the operator will be a mobile network operator (MNO). As shown in FIG. 1, the wireless communication system 100 comprises a subscriber domain SD, a core network domain CND and an access network domain AND. In some variants, these three domains are split into a user plane for transporting service traffic and a control plane for transporting control signalling. As understood herein, a particular domain comprises one or more devices, nodes or functions under control of a particular domain owner, such as a subscriber, an MNO or a content provider.

The core network domain CND and the access network domain AND each comprises one or more network nodes or network functions (NFs). For example, the access network domain AND may comprise one or more access points or base stations (not shown) configured to establish one or more wireless communication links to the subscriber domain SD. The core network domain CND comprises, among others, a subscriber database 110 and a subscriber capability information handler 120 configured to communicate with the subscriber database 110 (e.g., to access, write information into and read information from the subscriber database 110). The subscriber capability information handler 120 may be realized by one or more network nodes or network functions.

The subscriber domain SD comprises one or more terminal devices 130 configured to wirelessly communicate with the access network domain AND under a subscription regime. Exemplary terminal devices 130 comprise a user equipment—(UE-) type device (e.g., a smartphone, tablet or television set) or an Internet of Things—(IoT-) type device (e.g., a car or a wearable device such as a head-, hand- or body-mounted device) with wireless communication capabilities towards the access network domain AND.

The subscriber domain SD further comprises, although not necessarily as an entity of the wireless communication network 100 as such, a non-A/V medium generator 140 capable of communicating with the terminal device 130 and of generating and rendering (i.e., outputting) in the subscriber domain SD at least one non-A/V medium. The subscriber domain SD comprises all media rendering devices, typically consumer devices, under a subscriber's control and capable of communicating with, or integrated into, one or more terminal devices 130.

As such, in some versions, the terminal device 130 and the generator 140 are integrated into a single device, such as non-A/V medium enabled television set that has wireless communication capabilities under a subscription and that can render, or output, at least one non-A/V medium (e.g., scent) in addition to conventional A/V media (e.g., to support non-A/V enabled movies). In other versions, the generator 140 is a stand-alone device coupled to the terminal device 140 via a cable or a short-range wireless connection (e.g., Bluetooth). In such versions, the terminal device 130, or another device coupled to the terminal device 130, may be configured to render conventional A/V media such as movies, whereas the generator 140 may be configured to render, in a synchronized manner with A/V media output, at least one associated non-A/V medium. In still further versions, the generator 140 is configured as a wearable device (e.g., as a watch, helmet, glove or suit) configured to output a haptic non-A/V medium and optionally, at least one A/V medium. In such versions, the terminal device 130 may be integrated into a head mounted display or other wearable device configured to render a video in synchronization with haptic output rendered by the generator 140. Evidently, such and other media rendering versions may be combined as desired.

Digital instructions for the generator 140 to render the at least one non-A/V medium may be integrated into a digital content file or digital content stream with digital instructions for the terminal device 130, or other A/V media rendering device, to render one or both of audio and video media. Such digital content is also referred to as non-A/V enabled digital content herein.

With reference to FIG. 1, the network system 1000 further comprises a content provider domain CPD with a content server 150 (e.g., an Internet-based server offering media download or media streaming services). The content server 150 is configured to transmit digital content related to at least one non-A/V medium (such as a scent-enabled movie or other non-A/V enabled digital content) to the terminal device 130, via the core network domain CND and the access network domain AND.

Figure 2:
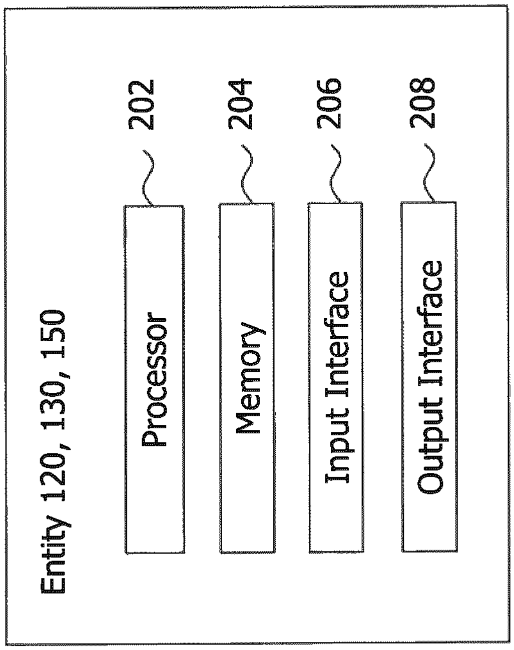
FIG. 2 is a block diagram illustrating apparatus realization of the present disclosure.

In the following, exemplary realizations of each of the subscriber capability information handler 120, the terminal device 130 and the content server 150 will be explained with reference to FIG. 2. As illustrated in FIG. 2, in one possible hardware implementation, each of the entities 120, 130 and 150 comprises a processor 202 and a memory 204 coupled to the processor 202. The memory 204 stores program code that controls operation of the processor 202 to implement aspects of the present disclosure. As understood herein, a processor, such as the processor 202, may be implemented using any processing circuitry and is not limited to, for example, a single processing core but may, for example, also have a distributed topology.

Each of the entities 120, 130 and 150 further comprises an optional input interface 206 and an optional output interface 208 for communication with each other and further entities in the network system 1000 of FIG. 1. As an example, the input and output interfaces 206, 208 of the subscriber capability information handler 120 allow that entity 120 to read retrieve subscriber capability information from the subscriber database 110 and to write subscriber capability information into the subscriber database 120. Additionally, those interfaces 206, 208 allow the subscriber capability information handler 120 to receive information from, and transmit information to, the subscriber domain SD and the content provider domain CPD. As a further example, the input and output interfaces 206, 208 of the terminal device 130 may permit a wireless communication with the access network domain AND and the generator 140.

Exemplary modes of operation of the subscriber capability information handler 120 in the core network domain CND, the terminal device 130 in the subscriber domain SD and the content server 150 in the content provider domain CPD will now be described with reference to the flow diagram 300 of FIG. 3.

As indicated by step 302, the terminal device 130 in the subscriber domain SD is configured to send, towards the core network domain CND, a subscriber capability report including subscriber capability information. The subscriber capability information is indicative of support of at least one non-A/V medium different from video and audio in the subscriber domain SD. As an example, the subscriber capability information may be indicative of the generator 140 being capable of generating (i.e., rendering) a tactile medium and/or an olfactory medium. To this end, a dedicated non-A/V medium indicator may be used to express the subscriber capability information (e.g., a tactile medium indicator and a olfactory medium indictor). The subscriber capability report may further be indicative of an identifier (e.g., a SUPI or SUCI) associated with the subscription for which the subscriber capability information is to be stored, or registered, in the core network domain CND.

The subscriber capability report of step 302 can be sent by the terminal device 140 in the context of session establishment (e.g., of a PDU session). The session may serve for transmission of digital content relating to (e.g., controlling output of) the at least one non-A/V medium from the content provider domain CPD towards the subscriber domain SD. In some cases, the subscriber capability report is a PDU Session Establishment Request message.

In step 304, the subscriber capability report is received by the subscriber capability information handler 120 in the core network domain CND and, in step 306, stored in the subscriber database 110. In more detail, the non-A/V medium indicator received with the subscriber capability report is registered in association with the subscription identified by the subscription identifier likewise included in the subscriber capability report. Moreover, in case the subscriber capability report is received in a session establishment context (e.g., in a PDU Session Establishment Request message), one or more session establishment-related steps may be performed in the core network domain CNF (as generally known in the art).

In step 308, the content server 150 in the content provider domain CPD sends a subscriber capability request towards the core network domain CND where it will eventually be received by the subscriber capability information handler 120. Step 308 will typically be performed after step 302, but not necessarily in a strict logical or temporal relationship with that step 302.

The subscriber capability request sent in step 308 by the content provider domain CND is typically triggered by the terminal device 140 having requested non-A/V media-enabled digital content from the content provider domain CND (e.g., in the context of the session that has been or is being established). In this case, the content server 150 may have to determine if the subscriber domain SD is actually capable of supporting non-A/V media rendering (e.g., if the subscriber domain comprises a generator 140 for a non-A/V medium). The subscriber capability request includes an identifier associated with a subscription (e.g., a SUPI or SUCI).

The subscriber capability information handler 120 in the core network domain CND receives, in step 310, the subscriber capability request with the subscription identifier. Responsive thereto, it retrieves, in step 312, from the subscriber database 110 subscriber capability information for the subscription associated with the identifier. This subscriber capability information has previously been stored, or registered, in the subscriber database 110 as explained above with reference to steps 304 and 306. The retrieved subscriber capability information is indicative of support of at least one non-A/V medium different from video and audio in the subscriber domain SD (e.g., it may be indicative of that the subscriber domain SD comprises a generator 140 for a non-A/V medium using, for example, one or more dedicated non-A/V medium indicators).

In step 314, the subscriber capability information handler 120 sends a subscriber capability response including the subscriber capability information towards the content provider domain CPD (e.g., to a core network entity interfacing the content provider domain CPD). Thus, in step 316, the subscriber capability response including the subscriber capability information is received in the content provider domain CPD.

As said, the subscriber capability information may be indicative of the generator 140 being capable of generating (i.e., rendering) a tactile medium and/or an olfactory medium, and a corresponding non-A/V medium indicator may be used to express the subscriber capability information. The content server 150 is thus aware of the particular non-A/V medium support in the subscriber domain SD and may transmit (e.g., stream or download) corresponding non-A/V medium-enabled digital content to the subscriber domain SD in a session context or in any other context.

The above general realizations of the present disclosure will now be described in greater detail with reference to certain technical specifications (TSs) defined by the 3rd Generation Partnership Project (3GPP) for 5G communication systems. 3GPP TS 23.501 V15.4.0 (2018-12) and later defines architectural aspects of a 5G service based architecture (SBA). According to this SBA, network functions (NF) use service-based interactions to consume services from other NFs. The discovery of services and of NFs producing them is provided by a network repository function (NRF). Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF will notify NFs of status changes of other NFs.

Figure 4:
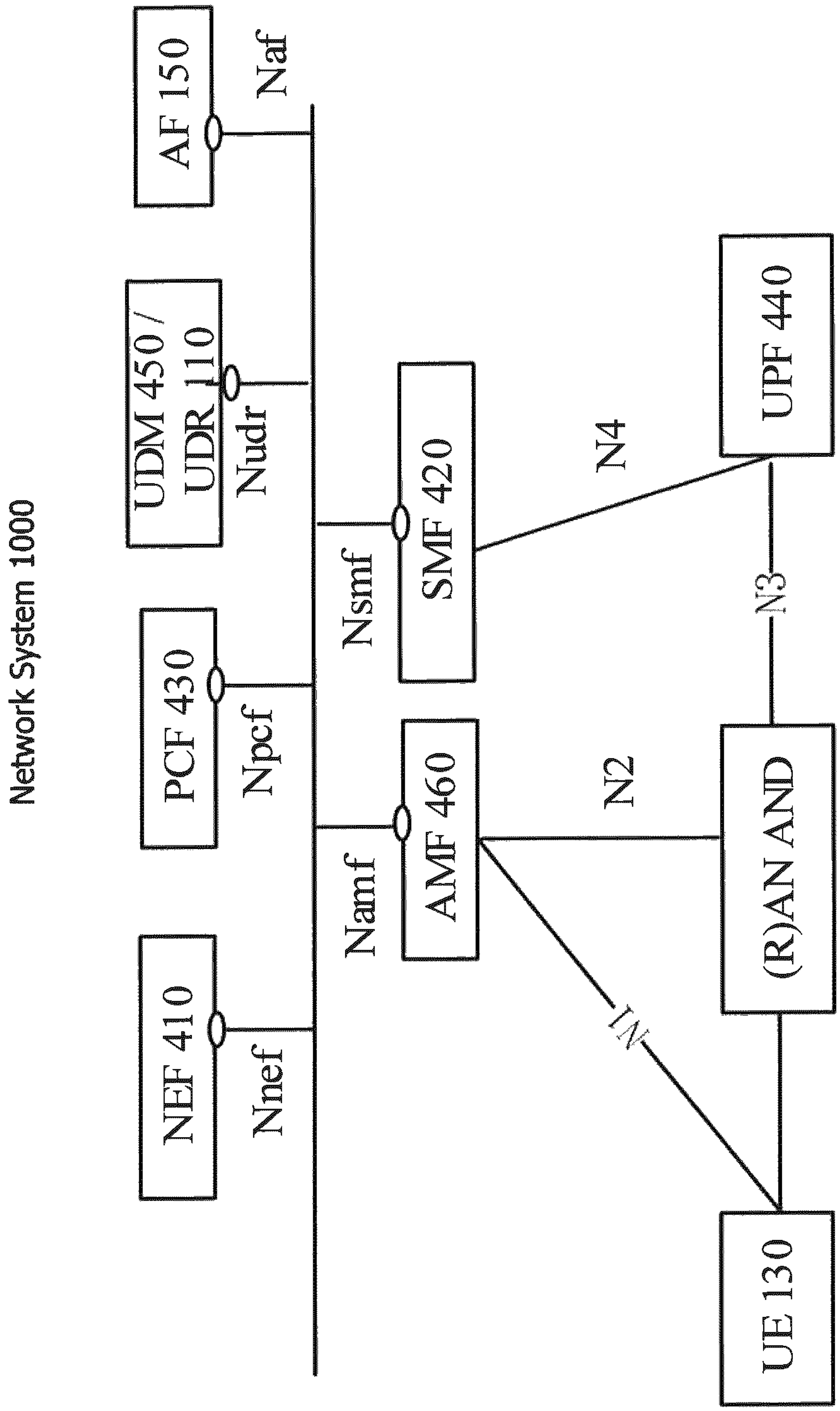
FIG. 4 is a diagram illustrating an exemplary 5G network architecture that can form the basis of realizations of the present disclosure.

FIG. 4 depicts a portion of the 5G reference architecture as defined by 3GPP (see, e.g., Section 4.2.3 of 3GPP TS 23.501 V15.4.0 and later). The relevant architectural core network entities (NFs), core network interfaces and other network entities for some realizations of the present disclosure include:

A User Equipment (UE) as an exemplary terminal device 130 (see FIG. 1). UE 130 constitutes, for example, an endpoint of a video or audio streaming session that stretches via the access network domain AND that may be configured as a radio access network (RAN). UE 130 is configured to output, or to trigger output, of at least one non A/V medium in the subscriber domain SD (e.g., via the generator 140 illustrated in FIG. 1)

An Application Function (AF) located outside the core network domain CND and typically implemented as, or on, a content server 150 operated by a dedicated content provider (e.g., an OTT entity). AF 150 is configured to interact with the core network domain CND via an Naf interface and, in particular, via one or more dedicated exposure APIs. In embodiments, AF 150 provides non-A/V medium enabled streaming or download services.

A Network Exposure Function (NEF) 410 has an Nnef interface and supports different functionalities. Specifically, in the context of the present disclosure, NEF 410 acts as an entry point into the core network domain CND for AF 150. AF 150 thus interacts with the core network domain CND through NEF 410. 3GPP has defined an exposure framework with a northbound interface between AF 140 and NEF 410 that supports dedicated APIs, including, in the present context, an API to exchange information between the core network domain CND and the content provider domain CPD about which content provider services (e.g., applications) and which subscribers support non A/V-related media.

A Session Management Function (SMF) 420 has N4 and Nsmf interfaces. SMF 420 supports procedures such as session establishment, modification and release as well as policy-related functionalities. SMF 420 is configured to receive Policy and Charging Control (PCC) rules from a Policy Control Function (PCF) 430. Moreover, SMF 420 configures a User Plane Function (UPF) 440 accordingly through the N4 interface using the Packet Forwarding Control Protocol (PFCP).

User plane function (UPF) 440 has an N4 interface to SMF 420 and an N3 interface to RAN AND. UPF 440 supports handling of user plane traffic (i.e., digital content) based on the rules received via SMF 420 from PCF 430. Specifically, in embodiments, UPF 440 supports packet inspection in regard to the service traffic (through PDRs), and further supports the application of associated traffic handling actions such as traffic steering, QoS enforcement, charging/reporting, and so on.

PCF 430 supports, via an Npcf interface, a unified policy framework to govern the core network domain CND behavior. Specifically, PCF 430 provides PCC rules to SMF 420 and/or UPF 440 to detect service traffic and enforce policy and charging decisions according to the PCC rules.

A unified data management (UDM) entity 450 centrally handles data (in particular subscriber information) in the core network domain CND. To this end, UDM 450 hosts or has access to a unified data repository (UDR) that acts as subscriber database 110 (see reference numeral 110 in FIG. 1). In some variants, UDM 450 implements the subscriber capability information handler 120 of FIG. 1 or at least a component thereof.

An access and mobility management function (AMF) 460 handles access and mobility for UE 130.

In certain realizations, at session establishment, UE 130 sends a non A/V medium (support) indicator to inform the core network domain CND that it can handle sense—(other than audio/video) related media. AMF 460 forwards this new indication to SMF 420. SMF 420 registers (i.e., stores) in UDM 450/UDR 110 this new indication (e.g., as part of the subscriber/session data to indicate that this subscriber's session is capable of handling a non-A/V medium). UDM 450, which in some variants implements the subscriber capability information handler 120 of FIG. 1, supports a new event (e.g., Event-ID=SenseEnabledMedia) to expose subscriber capability information towards the content provider domain CND (e.g., AF 150) through NEF 410 about subscribers (including subscriber sessions) with non-A/V medium support in the associated subscriber domain SD.

As a further enhancement, a subscription scheme is defined that allows a particular content provider domain (e.g., through an AF 150) can subscribe to the new event (e.g., Event-ID=SenseEnabledMedia) through NEF 410 using a subscription message. The subscription message may include one or more of the following parameters:

- AF-ID (e.g., Netflix Inc)
- App-ID (e.g., Netflix)
- Sense-Media-Type=Scent (as an example, but might also be "Tactile" or other)
- List of UE-ID(s) (e.g, a single UE-ID, a group of UE-IDs or Any UE)

When, based on this subscription scheme, the content provider domain CPD gets notified by UDM 450 (through NEF 410) that sense—(i.e., non-A/V-) enabled media are supported for the subscriber's session, AF 150 streams non A/V-enabled media (e.g., together with A/V media) via the core network domain CND and the access network domain AND to the subscriber domain SD that requested those media.

In the following description, exemplary 5G signaling realizations implementing such a messaging procedure will be described with reference to FIGS. 5 to 8 and the 5G entities discussed above with reference to FIG. 4. It will be apparent to one skilled in the art that similar signaling realizations will apply in case of a 4G or a combined 4G/5G implementation.

Figure 5:
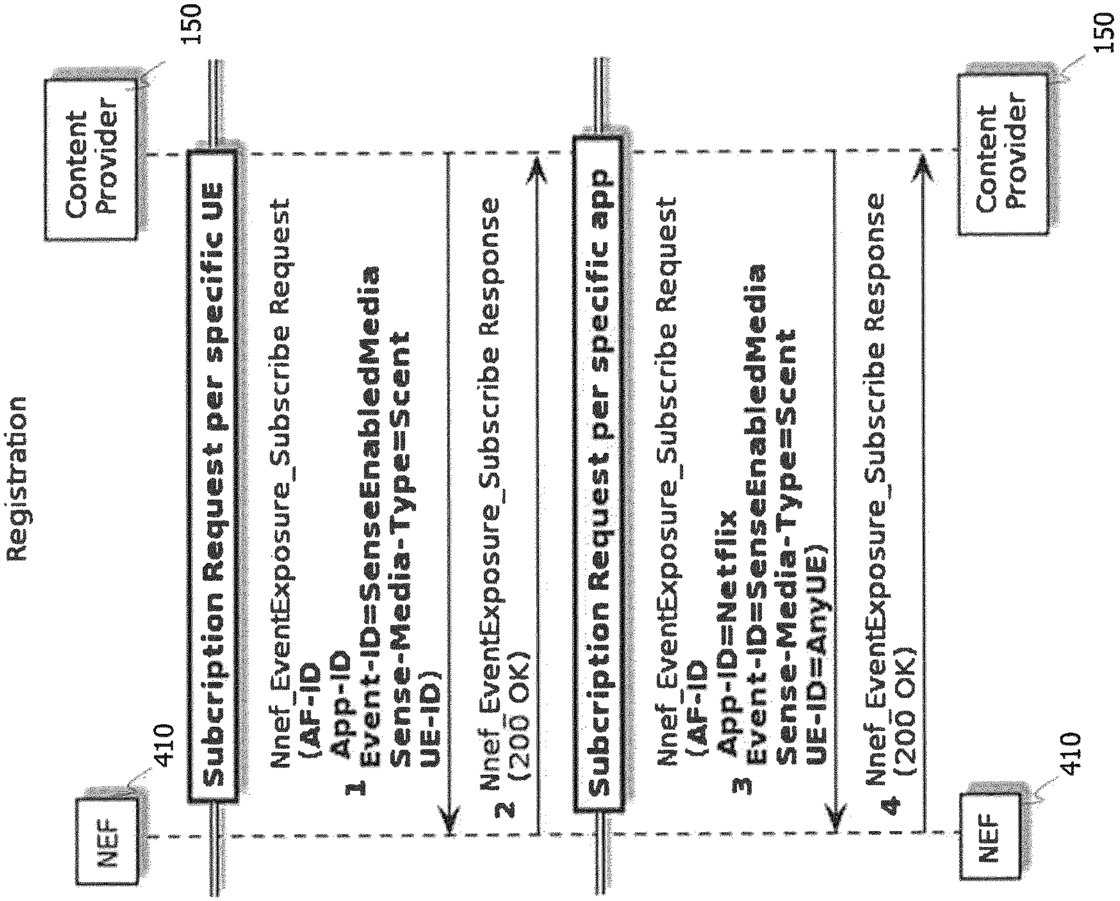
FIGS. 5 to 11 are schematic diagram signalling diagrams illustrating further embodiments of the present disclosure in the context of the 5G network architecture of FIG. 4.

FIG. 5 shows an example of a signaling procedure for registering a content provider (i.e., AF 150) subscription to a non-A/V medium-related event (Event-ID=SenseEnabledMedia) in the core network domain CND. Content provider's AF 150 can subscribe to an event for a specific application (App-ID) and/or for a specific UE 130, group of UEs or any UE.

In signaling step 1 of FIG. 5, using the Nnef_EventExposure Service API, content provider's AF 150 subscribes to an event related to scent and for a specific UE 130 associated with the dedicated identifier UE-ID. This is done by triggering a Nnef_EventExposure_Subscribe Request message including the following parameters:

- Event-ID: SenseEnabledMedia (i.e., a newly defined event)
- AF-ID
- App-ID
- Sense-Media-Type=Scent (as exemplary non-A/V medium indicator, but might also be "Tactile" or other)
- UE-ID (i.e., an identifier associated with the subscription of UE 130, such as its SUPI)

App-ID not being present or not being associated with any particular parameter value (such as "Netflix") can be interpreted in certain variants as being indicative of "any App". In signaling step 2 of FIG. 5, NEF 410 acknowledges this request by an associated response.

Alternatively, as also illustrated in FIG. 5, content provider's AF 150 can subscribe to a particular event for any UE. This is shown in signaling steps 3 and 4 of FIG. 5. In step 3, using the Nnef_EventExposure Service API, AF 150 subscribes to scent-related events for any UE. This is done by triggering a Nnef_EventExposure_Subscribe Request message including the following parameters (note: UE-ID not being present can in some variants be assumed to indicate any UE, alternatively an express parameter UE-ID=AnyUE can be defined, and similar for App-ID):

- Event-ID: SenseEnabledMedia
- AF-ID
- App-ID=Netflix
- UE-ID=AnyUE.
- Sense-Media-Type=Scent (might also be "Tactile" or other)

In signaling step 4 of FIG. 5, NEF 410 acknowledges this request by an associated response. Then, when any UE 130 and/or App-ID for which AF 150 has requested scent-enabled media is available, NEF 410 will notify AF 150 using a Nnef_EventExposureService Notify message.

Figure 6:
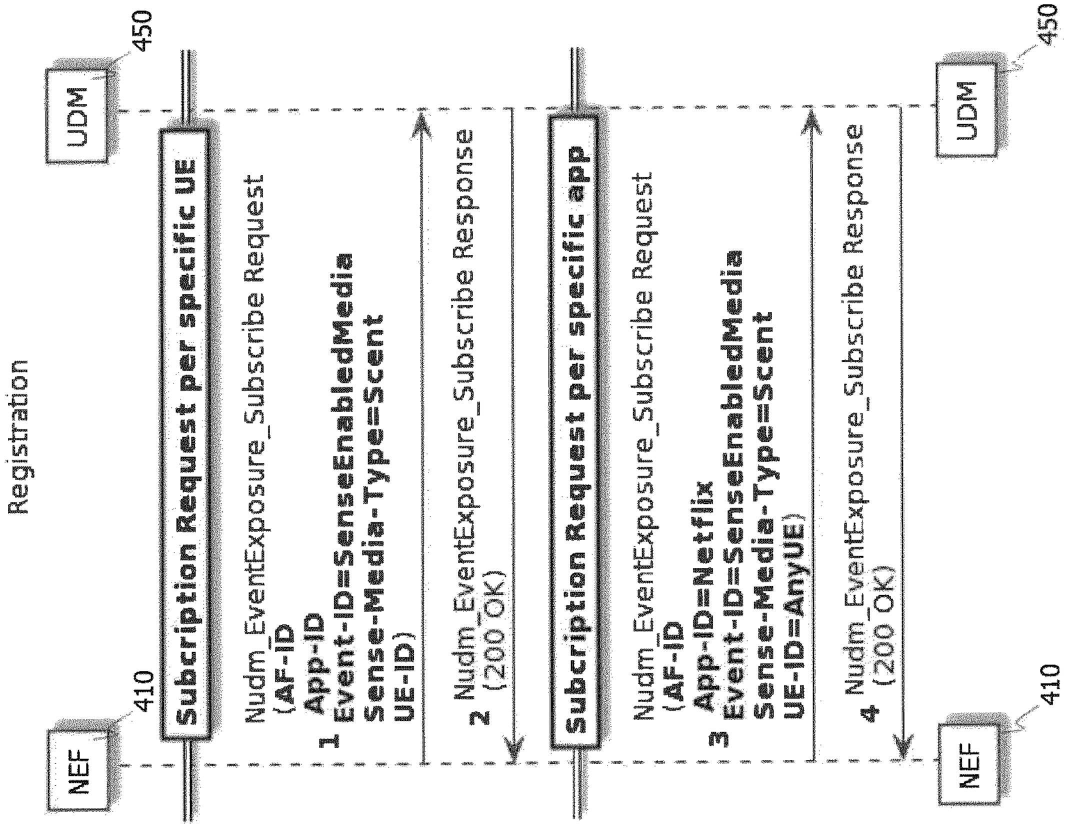

FIG. 6 illustrates the signaling steps for NEF 410 subscribing to the newly defined event at UDM 450. Those steps are similar to the ones in FIG. 5 for the two scenarios specific UE/any UE. A detailed explanation, therefore, is omitted here. UDM 450 is the one that is the owner of information of subscribers with non-A/V medium generators 140.

Figure 7:
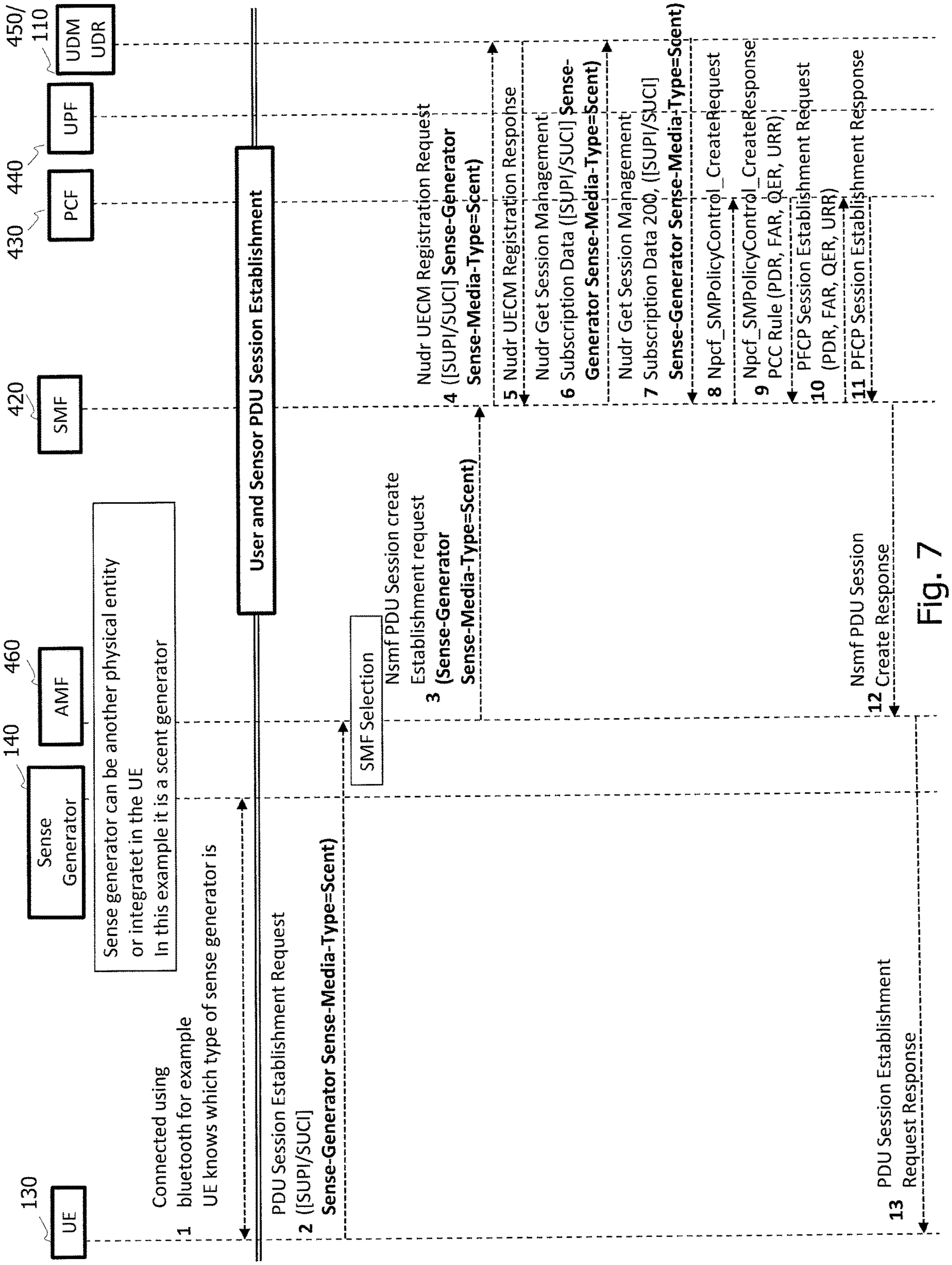
Figure 8:
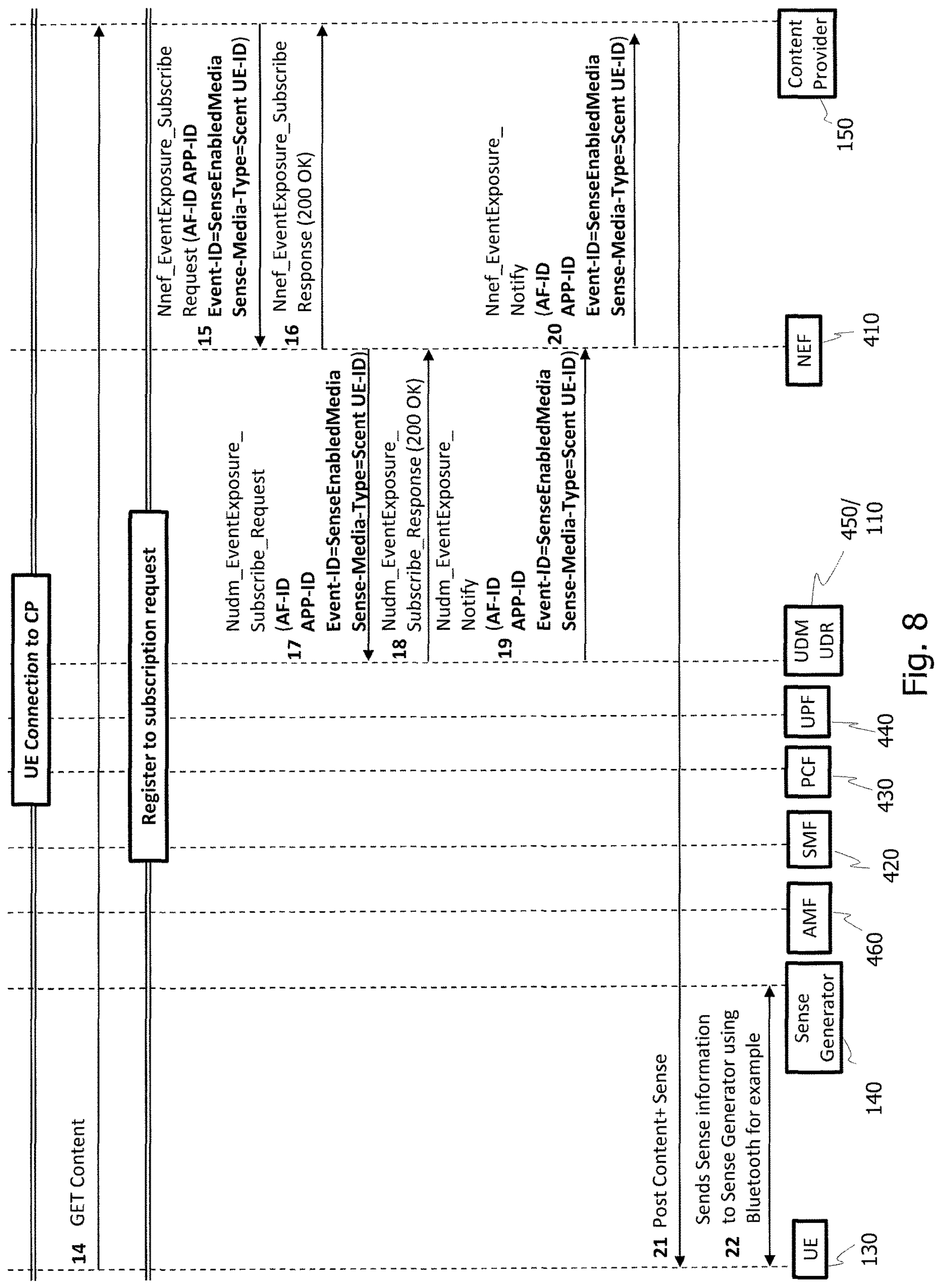

The signaling diagrams of FIGS. 7 and 8 illustrate the steps of session establishment and also the associated digital content transmission session for a given App-ID and non-A/V enabled media. FIGS. 7 and 8 relate to a subscription scenario when, using the Nnef_EventExposure Service API, content provider's AF 150 subscribes to an event related to scent for a specific UE 130

In signaling step 1 of FIG. 7, UE 130 will connect using, for example, personal area network (PAN) connectivity to sense generator 140. Bluetooth and other technologies can be used also. As an alternative not depicted in this example, the generator 140 can have a subscriber identity module (SIM) that can connect to the access network domain AND (see FIG. 1) and associated with a subscription. As such the generator 140 can be configured as a UE.

Using signaling between UE 130 and generator 140, or using a pre-configuration, UE 130 knows which type of generator 140 it is connected to. In this example, it is a scent generator 140 capable of providing olfactory medium.

In signaling step 2 of FIG. 7, UE 130 triggers a PDU Session Establishment Request towards the core network domain CND (here: AMF 460). The corresponding message includes a subscription-related identifier of UE 130 (e.g., its SUPI as exemplary UE-ID) and a parameter informing the core network domain CND about subscriber domain SD capabilities in regard to support of at least one non-A/V medium (see also steps 302 and 304 in FIG. 3). This parameter is exemplarily called SenseGenerator. It is a Boolean parameter, but other formats can be included as well. In the present realization, the parameter is associated with an optional indicator (Sense-Media-Type) defining which type of non-A/V medium is supported. In this case, the indicator has the value "Scent" (i.e., is indicative of olfactory medium support by the generator 140 in the subscriber domain SD).

In signaling step 3, AMF 460 sends a Nsfm Session Create message to SMF 420. This messages includes the UE-ID and the subscriber capability information (Sense-Generator, Sense-Media-Type) received from UE 130 in step 2.

Then, in signaling step 4, SMF 420 registers the subscriber capability information in UDM 450 with its associated UDR 110 by way of a Nudr_UECM_Registration_Request message. In more detail, the subscriber capability information is registered in a user profile of the subscription associated with the UE-ID of UE 130 (see step 306 in FIG. 3). The registered information includes the parameter Sense-Generator and the associated value Sense-Media-Type=Scent. In signaling step 5, UDM 450 acknowledges the registration with a registration response message.

In signaling step 6, SMF 420 requests subscription profile information from UDM 450 in a Nudr_Get_Session_Management_Subscription_Data message, and in signaling step 7, UDM 450 sends the requested information (as retrieved from UDR 110) to SMF 420. This information includes the subscriber capability information (SenseGenerator, Sense-Media-Type) as transmitted by UE 130 in step 2.

In signaling step 8, SMF 420 establishes an association with PCF 440. In more detail, SMF 420 selects PCF 430 for session handling, considering that the current session needs "SenseGenerator with Sense-Media-Type=Scent" capacities. In signaling step 9, the selected PCF 430 answers to the request from SMF 420.

In signaling step 10, SMF 420 establishes and selects a connection towards a UPF 440. In more detail, it selects a UPF 440 for session handling considering the subscriber capability information (including "SenseGenerator with Sense-Media-Type=Sent"). In signaling step 11, the selected UPF 40 answers to the request from SMF 420.

In signaling step 12, SMF 420 answers AMF request as received in signaling step 3, and in signaling step 13, AMF 460 answers the UE request as received in signaling step 2. At this point, the PDU session is established.

It will be appreciated that generator 140 may be enabled, or activated, for some sessions and not enabled, or deactivated, for other sessions. As such, the validity of the subscriber capability information will be limited in UDM 450/UDR 110 to a single PDU session for digital content transmission. The subscriber capability information in UDM 450/UDR 110 may thus be deleted when the session is terminated.

Turning now to FIG. 8, in signaling step 14, UE 130 requests digital content from AF 150 in the content provider domain CPD. The requested digital content includes instructions for the generator 140 to render an olfactory medium (e.g., in the context of video or audio streaming).

Figure 3:
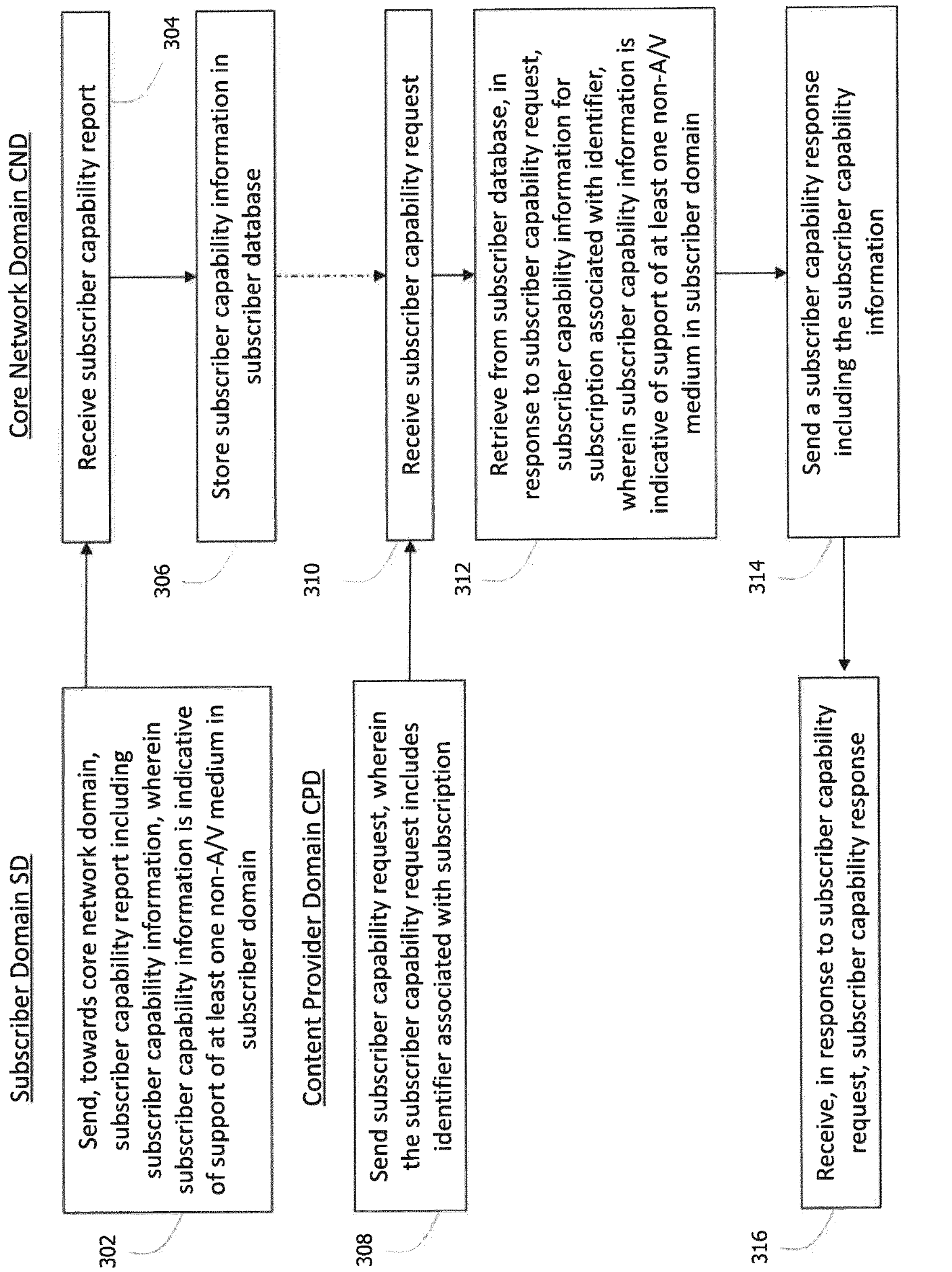
FIG. 3 is a flow diagram illustrating a method realization of the present disclosure.

In signaling step 15, the content provider's AF 150, using same procedure as discussed above with reference to the upper portion of FIG. 5, subscribes to non-A/V support in the subscriber domain SD of UE 130 (see step 308 in FIG. 3). Thus, using the Nnef_EventExposure Service API, AF 150 subscribes to scent-related events associated with UE 130 in a Nnef_EventExposure_Subscribe Request message (i.e., a subscriber capability request) having the following content:

Event-ID: SenseEnabledMedia
AF-ID.
App-ID
Sense-Media-Type=Scent (in this example)
UE-ID The Event-ID (in optional combination with the Sense-Media-Type value) serves as indicator for the core network domain CND to indicate that the present subscriber capability request is directed to non-A/V medium ("SenseEnabledMedia") support.

In signaling step 16, NEF 410 acknowledges this subscription request, see also FIG. 5.

In signaling step 17, NEF 410 requests from UDM 450 subscriber capability information concerning scent-related events for UE 130. It will be the same mechanism as defined in the upper portion of FIG. 6:

Event-ID: SenseEnabledMedia
AF-ID
App-ID
Sense-Media-Type=Scent (in this example)
UE-ID In signaling step 18, UDM 450 acknowledges this request and retrieves the corresponding information from the user profile for the subscription associated with the UE-ID as stored in the UDR 110 (see step 312 in FIG. 3).

In signaling step 19, UDM 450 notifies NEF 410, in the given subscription context, of the subscriber capability information (including "SenseGenerator with Sense-Media-Type=Sent") regarding support of non-A/V media in the subscriber domain SD of UE 130. In signaling step 20, NEF 410 notifies to AF 150 of the subscriber capability information (see signaling steps 314 and 316 in FIG. 3).

As such, AF 150 is informed that UE 130 is associated with scent generator 140 and can respond to the request received in step 14 by streaming or downloading scent-enabled digital content to UE 130 in step 21. In signaling step 22, UE 130 forwards (at least) the scent-related instructions as contained in the digital content to scent generator 140 for rendering.

Figure 9:
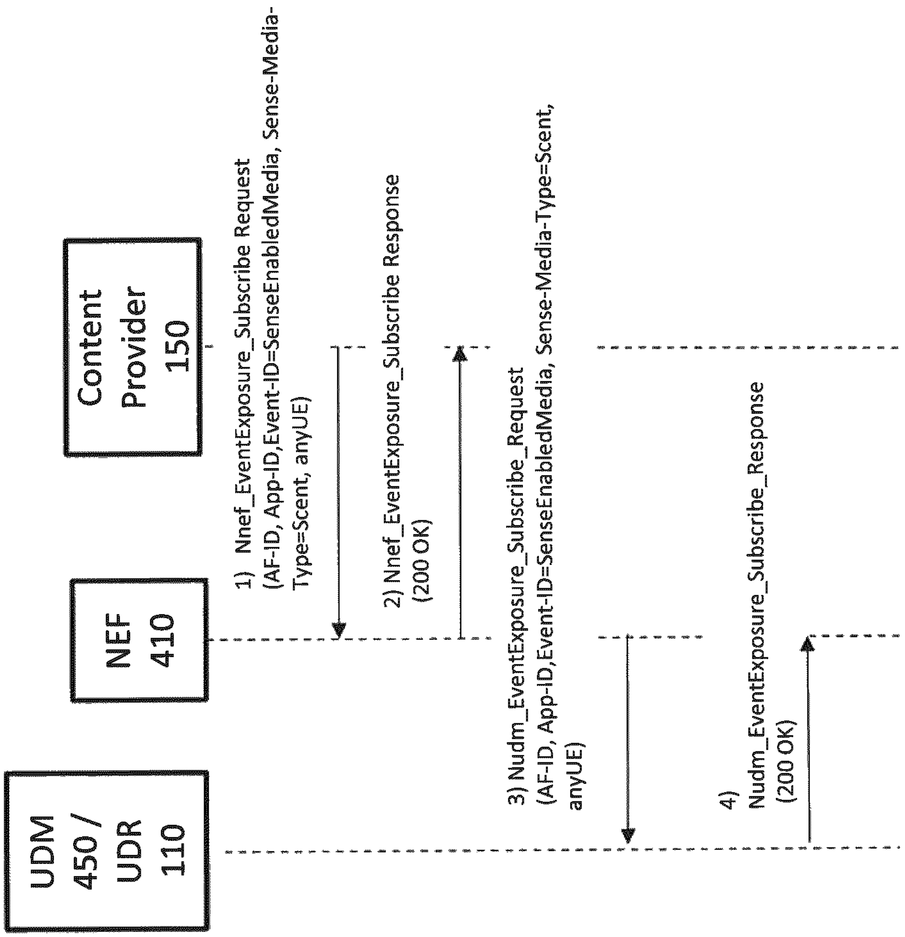
Figure 10:
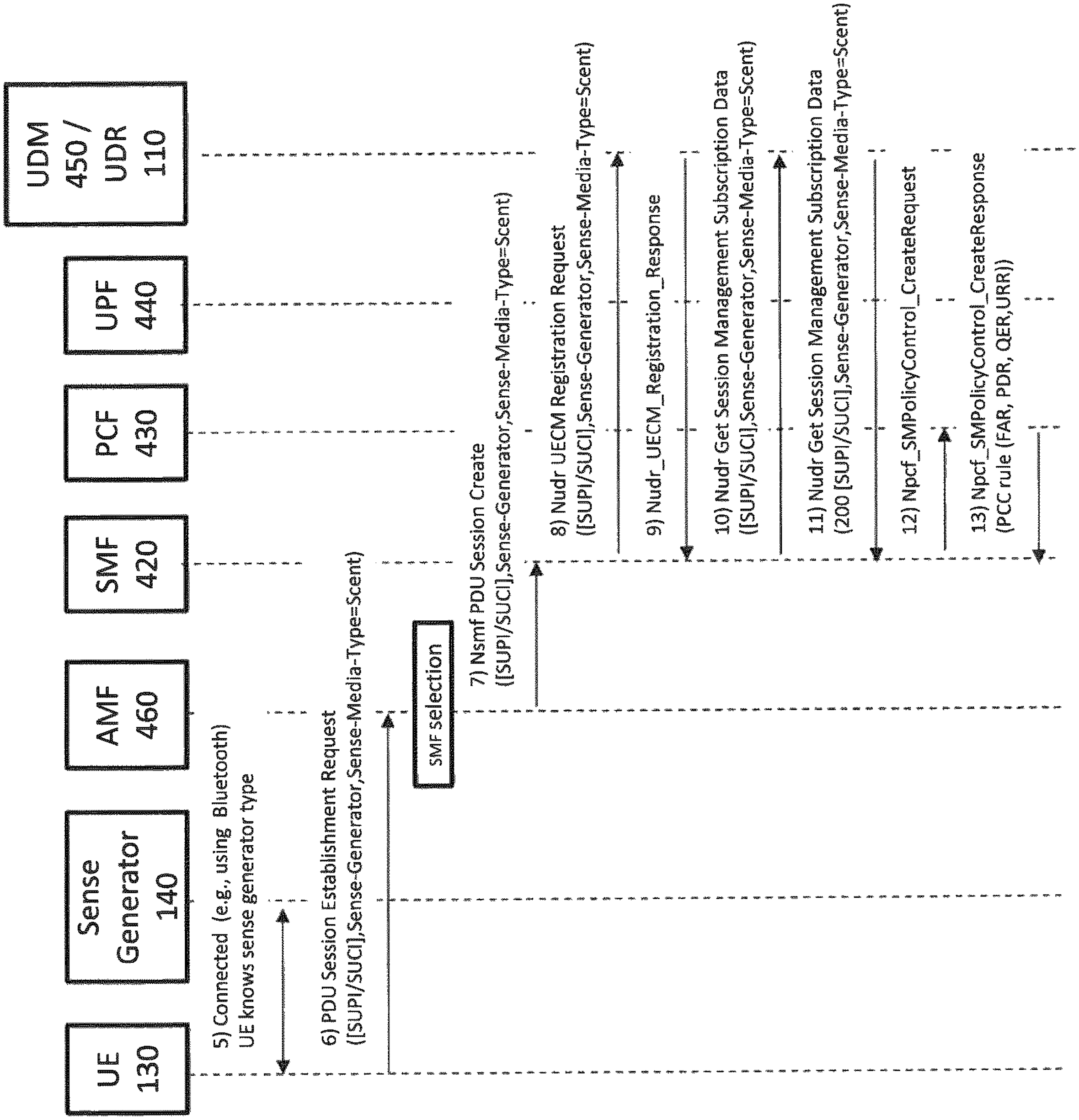
Figure 11:
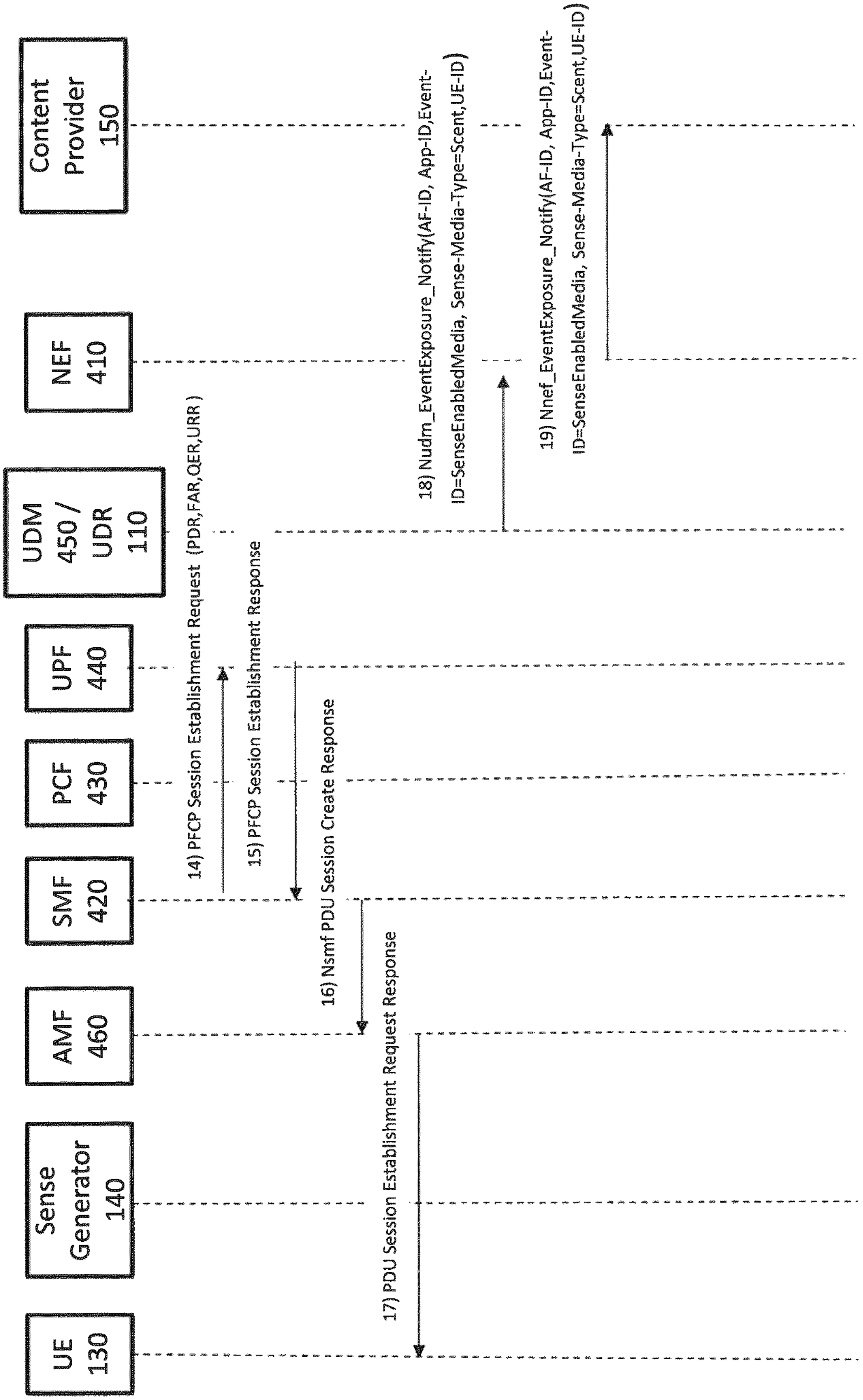

The signaling diagrams of FIGS. 9 to 11 illustrate the steps of session establishment and AF notification for the "any UE" case. Thus, FIGS. 9 to 11 relate to a subscription scenario when, using the Nnef_EventExposure Service API, content provider's AF 150 subscribes to an event related to scent for any UE 130 and for any App-ID or a given App-ID (see the lower portions of FIGS. 5 and 6, that relate to a scenario for any UE 130 an a particular App-ID=Netflix).

With reference to the signaling diagram of FIG. 9, signaling steps 1 and 2 thus correspond to signaling steps 3 and 4 of FIG. 5, respectively, and signaling steps 3 and 4 of FIG. 9 correspond to signaling steps 3 and 4 of FIG. 6, respectively. With reference to the signaling diagram of FIG. 10, signaling steps 5 to 13 correspond to signaling steps 1 to 9 of FIG. 7, respectively. With reference to the signaling diagram of FIG. 11, signaling steps 14 to 17 correspond to signaling steps 10 to 13 of FIG. 7, respectively. With continued reference to the signaling diagram of FIG. 11, signaling steps 18 and 19 correspond to signaling steps 19 and 20 of FIG. 7, respectively. In the signaling diagram of FIG. 11, after session establishment, the UE 130 may request digital content (see step 14 in FIG. 8), and the content provider's AF 150—having been made in step 19 aware of the non-A/V medium support in the subscriber domain SD—may start transmitting corresponding content (see step 21 in FIG. 8).

In the scenario of FIG. 8, the trigger for the subscribe request (see step 15) is the content provider's AF 150 receiving a content request from UE 130 (see step 14: Get Content). In the scenario of FIG. 9, the trigger for the subscribe request will occur within the content provider domain CPD. As such, the process of FIG. 9 on the one hand and the process of FIGS. 10 and 11 on the other hand could be performed asynchronously. The variant of FIGS. 9 to 11 reduces the signaling overhead of the content provider's AF 150 since the subscribe request need not be transmitted per UE session.

As has become apparent from the above description of exemplary realizations, the technique presented herein allows MNOs to support the "Internet of Senses" in their 4G/5G-enabled networks. At the same time, content providers are assisted in the provision of enhanced digital content using "Internet of Senses" technology via mobile communications networks. Moreover, MNOs are enabled to select core network capabilities (e.g., NFs such as PCFs and/or UPFs) that can best assist the provision of non-A/V media from a content provider domain CPD to a subscriber domain SD.

The invention claimed is:

1. A method of retrieving capability information from a subscriber database in a core network domain (CND) of a wireless communication network, the method comprising:
- receiving a subscriber capability request, wherein the subscriber capability request includes a first identifier associated with a subscription;
- retrieving from the subscriber database, in response to the subscriber capability request, subscriber capability information for the subscription associated with the first identifier, wherein the subscriber capability information is indicative of support of at least one non-Audio/Video (A/V) medium different from video (V) and audio (A) in a subscriber domain (SD);
- selecting one or more core network entities for digital content transmission session handling based on the subscriber capability information that is indicative of support of the at least one non-A/V medium; and
- sending a subscriber capability response including the subscriber capability information.

2. The method of claim 1, wherein the subscriber capability request includes an indicator indicative of the subscriber capability request being directed to non-A/V medium support.

3. The method of claim 1, wherein the subscriber capability request is received from, and the subscriber capability response is sent to, a core network entity interfacing a content provider domain (CPD) capable of controlling transmission of digital content relating to the at least one non-AN medium towards the subscriber domain (SD).

4. The method of claim 3, wherein the subscriber capability request has been triggered in the content provider domain (CPD).

5. The method of claim 4, wherein:
- the network entity interfacing the content provider domain is a network exposure function (NEF) of a 5th Generation (5G) enabled core network domain (CND) or a service capability exposure function gateway (SCEF) of a 4th Generation (4G) enabled core network domain (CND);
- the subscriber capability request, in a case of an NEF, is a Nudm_EventExposure Request that has been triggered by an Nnef_EventExposure_Subscribe Request received at the NEF from the content provider domain (CPD); and
- the subscriber capability response is a Nudm_EventExposure_Notify message.

6. The method of claim 1, wherein the first identifier associated with the subscription identifies a terminal device having requested digital content relating to the at least one non-AN medium.

7. The method of claim 1, wherein the receiving, the retrieving, and the sending are performed in a context of a session for transmission of digital content relating to the at least one non-AN medium towards the subscriber domain (SD).

8. The method of claim 1, wherein the subscriber capability information has a validity limited to a single digital content transmission session.

9. The method of claim 1, further comprising:
- receiving a subscriber capability report including the subscriber capability information, wherein the subscriber capability report includes the first identifier or a second identifier associated with the subscription; and
- storing the subscriber capability information for the subscription associated with the first or second identifier in the subscriber database.

10. The method of claim 1, wherein the subscriber capability information is received in the core network domain (CND) from the subscriber domain (SD) in a context of establishment of a digital content transmission session.

11. The method of claim 9, wherein the subscriber capability report is one of a Packet Data Unit (PDU) Session Establishment Request message, an Nsmf PDU Session Create message, an Nudr UECM Registration_Request message, and a Nudr_Get Session Management Subscription Data message.

12. The method of claim 1, wherein the selecting is performed by one of:
- a session management function (SMF) of a 5th Generation (5G) enabled core network domain (CND); and
- a control plane packet data network gateway (PGW-C) of a 4th Generation (4G) enabled core network domain (CND).

13. The method of claim 1, wherein the selecting relates to at least one of:
- a user plane function (UPF) and a policy control function (PCF) of a 5th Generation (5G) enabled core network domain (CND); and
- a user plane packet date network gateway (PGW-U) of a 4th Generation (4G) enabled core network domain (CND).

14. The method of claim 1, wherein the subscriber capability information contains at least one non-A/V medium indicator indicative of support of the at least one non-A/V medium.

15. The method of claim 14, wherein the at least one non-A/V medium indicator is one of:
- a tactile medium indicator; and
- an olfactory medium indicator.

16. The method of claim 1, wherein the subscriber database is hosted by one of:
- a unified data repository (UDR) entity of a 5th Generation (5G) enabled core network domain (CND); and a home subscriber server, HSS, of a 4th Generation (4G) enabled core network domain (CND).

17. The method of claim 1, wherein the method is performed in the core network domain (CND).

18. An apparatus for retrieving capability information from a subscriber database in a core network domain (CND) of a wireless communication network, the apparatus comprising:

processing circuitry; and memory configured to store a control program that, when executed by the processing circuitry, configures the processing circuitry to:

receive a subscriber capability request, wherein the subscriber capability request includes an identifier associated with a subscription;

retrieve from the subscriber database, in response to the subscriber capability request, subscriber capability information for the subscription associated with the identifier, wherein the subscriber capability information is indicative of support of at least one non-AN medium different from video (V) and audio (A) in a subscriber domain (SD);

selecting one or more core network entities for digital content transmission session handling based on the subscriber capability information that is indicative of support of the at least one non-A/V medium; and send a subscriber capability response including the subscriber capability information.

19. A non-transitory computer readable medium comprising instructions stored thereon that, when executed by processing circuitry of an apparatus configured to retrieve capability information from a subscriber database in a core network domain (CND) of a wireless communication network, configures the apparatus to:

receive a subscriber capability request, wherein the subscriber capability request includes an identifier associated with a subscription;

retrieve from the subscriber database, in response to the subscriber capability request, subscriber capability information for the subscription associated with the identifier, wherein the subscriber capability information is indicative of support of at least one non-AN medium different from video (V) and audio (A) in a subscriber domain (SD);

selecting one or more core network entities for digital content transmission session handling based on the subscriber capability information that is indicative of support of the at least one non-AN medium; and send a subscriber capability response including the subscriber capability information.

* * * * *